US010086785B2

(12) United States Patent
Wu et al.

(10) Patent No.: US 10,086,785 B2
(45) Date of Patent: Oct. 2, 2018

(54) FRONTAL SHIELD SYSTEM FOR ENHANCED VEHICLE COMPATIBILITY PERFORMANCE

(71) Applicant: FORD GLOBAL TECHNOLOGIES, LLC, Dearborn, MI (US)

(72) Inventors: Fubang Wu, Woodhaven, MI (US); Mohamed Ridha Baccouche, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 15/248,111

(22) Filed: Aug. 26, 2016

(65) Prior Publication Data
US 2018/0056906 A1 Mar. 1, 2018

(51) Int. Cl.
*B60R 19/34* (2006.01)
*B60R 19/18* (2006.01)
*B60R 19/12* (2006.01)

(52) U.S. Cl.
CPC .............. *B60R 19/34* (2013.01); *B60R 19/12* (2013.01); *B60R 19/18* (2013.01); *B60R 2019/186* (2013.01)

(58) Field of Classification Search
CPC ................................. B60R 19/34; B60R 19/12
USPC ........................................ 293/102, 120, 109
See application file for complete search history.

(56) References Cited

U.S. PATENT DOCUMENTS

| 4,826,226 | A  | * | 5/1989  | Klie    | B60R 19/22 |
|           |    |   |         |         | 293/120    |
| 6,318,773 | B2 | * | 11/2001 | Storer  | B60R 19/52 |
|           |    |   |         |         | 293/115    |
| 6,793,256 | B2 |   | 9/2004  | Carley et al. |  |
| 7,641,246 | B2 | * | 1/2010  | Ichikawa | B60R 19/023 |
|           |    |   |         |         | 293/102    |
| 8,905,463 | B2 |   | 12/2014 | Kuhne   |            |
| 2003/0067178 | A1 | * | 4/2003 | Bastien | B60R 19/12 |
|           |    |   |         |         | 293/120    |
| 2003/0111852 | A1 | * | 6/2003 | Carley  | B29C 44/1228 |
|           |    |   |         |         | 293/109    |
| 2003/0218341 | A1 | * | 11/2003 | Jonsson | B60R 19/18 |
|           |    |   |         |         | 293/102    |
| 2015/0307044 | A1 | * | 10/2015 | Hundley | B60R 19/18 |
|           |    |   |         |         | 293/120    |

FOREIGN PATENT DOCUMENTS

EP    2196381 B1    3/2011

* cited by examiner

*Primary Examiner* — Joseph D. Pape
(74) *Attorney, Agent, or Firm* — Jason Rogers; Brooks Kushman P.C.

(57) ABSTRACT

A front end structure is disclosed for a vehicle to enhance vehicle compatibility performance. The front end structure includes a bumper disposed behind a front fascia panel. Crush cans are attached between the bumper and a frame rail. A shield is attached to the bumper that extends above the bumper and below the bumper to spread deformation caused by the crush cans and bumper of a deformable barrier in a collision to areas above and below the bumper.

17 Claims, 5 Drawing Sheets

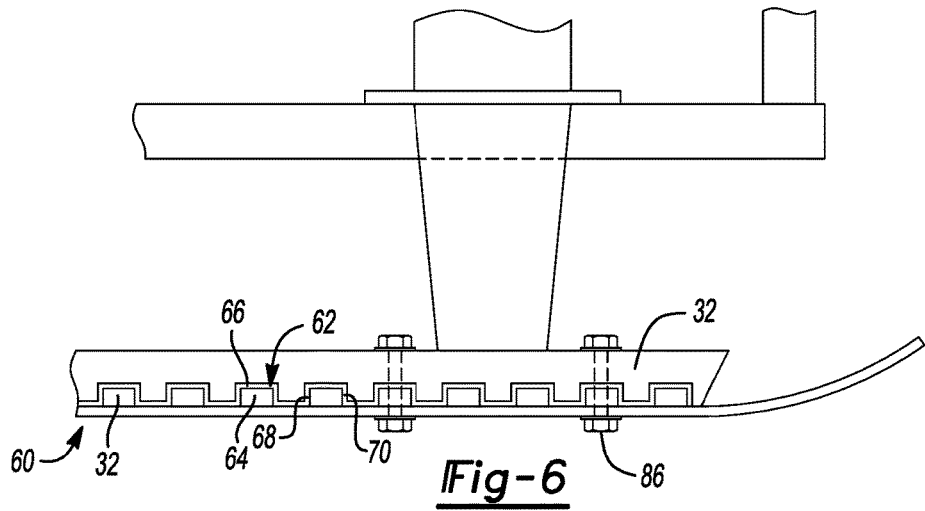
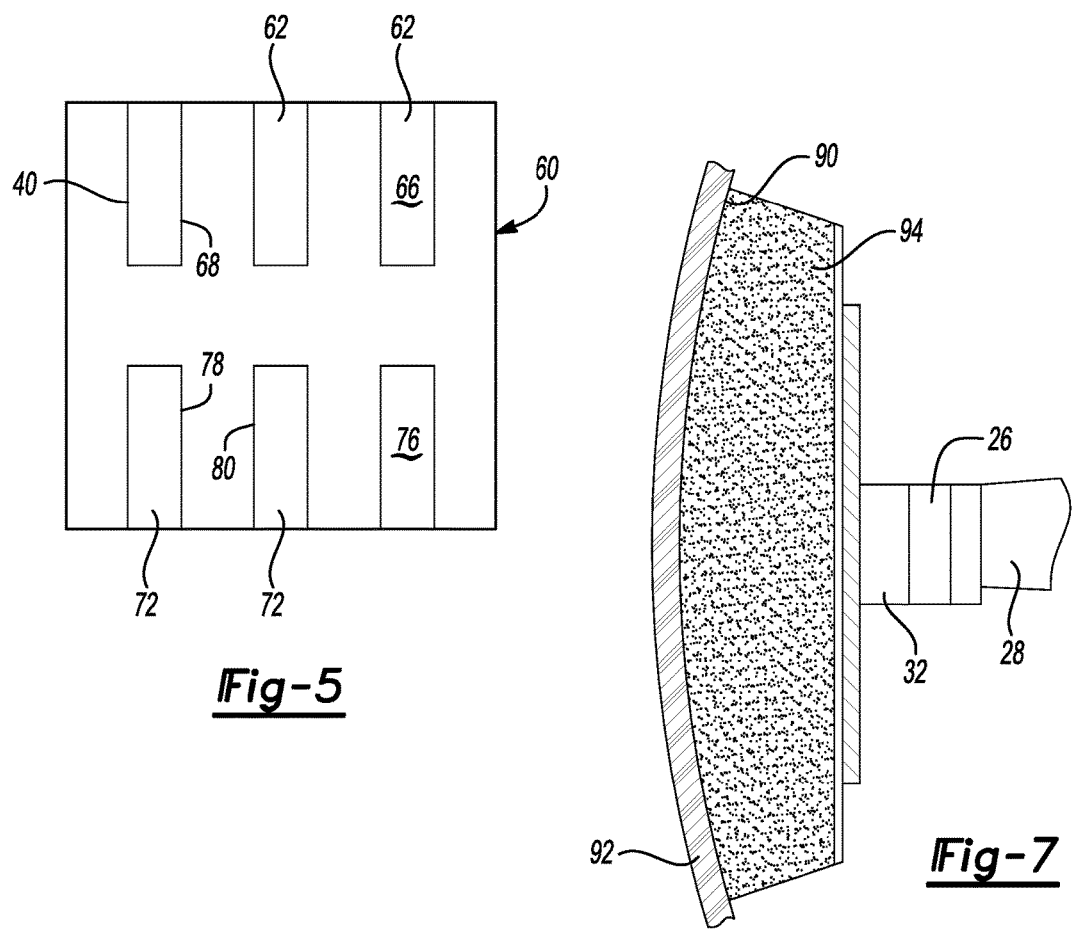

|  |  |  | Weighting | Note | Symbol |
|---|---|---|---|---|---|
| Homogenity / Geometry |  | 103 | 75% | 3.7 | ⊖ |
| Energy Input |  |  | 25% | 2.2 | + |
|  | Barrier Energy | 79% | 50% | 1.4 | ++ |
|  | △v Barrier | 57.1 km/h | 50% | 3.0 | ○ |
|  | Bottom Out | 0 |  |  |  |
| Overall Rating |  |  |  | 3.3 | ○ |

|  | Weighting | Note | Symbol |
|---|---|---|---|
| Homogenity / Geometry | 75% | 3.7 | ⊖ |
| Energy Input | 25% | 3.4 | + |
| Overall Rating |  | 3.4 | ○ |

| Note |  |
|---|---|
| ++ → | Very Good |
| + → | Good |
| ○ → | Average |
| ⊖ → | Bare Min |
| -- → | Poor |

*Fig-8*

|  |  |  | Weighting | Note | Symbol |
|---|---|---|---|---|---|
| Homogenity / Geometry |  | 81 | 75% | 2.8 | ○ |
| Energy Input |  |  | 25% | 2.7 | ○ |
|  | Barrier Energy | 55% | 50% | 2.3 | + |
|  | △v Barrier | 57.1 km/h | 50% | 3.0 | ○ |
|  | Bottom Out | 0 |  |  |  |
| Overall Rating |  |  |  | 2.8 | ○ |

|  | Weighting | Note | Symbol |
|---|---|---|---|
| Homogenity / Geometry | 75% | 2.8 | ○ |
| Energy Input | 25% | 2.7 | ○ |
| Overall Rating |  | 2.8 | ○ |

| Note |  |
|---|---|
| ++ → | Very Good |
| + → | Good |
| ○ → | Average |
| ⊖ → | Bare Min |
| -- → | Poor |

*Fig-9*

FRONTAL SHIELD SYSTEM FOR ENHANCED VEHICLE COMPATIBILITY PERFORMANCE

TECHNICAL FIELD

This disclosure relates to a shield attached to a vehicle bumper that is subjected to testing in a collision with a progressive deformable barrier and evaluated, in part, based upon the homogeneity of the deformation of the barrier.

BACKGROUND

Vehicles are subject to a wide variety of tests that are mandated by government regulations and insurance certifications. Tests for energy absorption, durability and passenger protection are conducted on new vehicles. Intrusions into the passenger compartment are analyzed in several tests related to occupant protection in a collision.

Due to the numerous types of collisions, new tests are constantly being proposed to improve occupant safety, pedestrian safety and the safety of other vehicle occupants. A new vehicle test for testing a vehicle is a test entitled "2020 Euro NCAP test" that tests for intrusions and also tests for compatibility of a vehicle design with other vehicles that may be involved in a collision. One measure of compatibility in the NCAP test relates to the homogeneity of the deformation of a Moveable Progressive Deformable Barrier (MPDB) that collides with a moving vehicle. The root cause of poor homogeneity test results is that the bumper beam/crush can punch a deep hole in the deformable barrier. Deeper deformation areas on the movable barrier are undesirable and result in unsatisfactory test results.

Modifications to the design of a vehicle must not only meet currently passenger protection based crash safety requirements, i.e. FMVSS, IIHS, NCAP, EU-NCAP, etc., but also must be made to enhance the additional upcoming requirements of crash compatibility. The crash compatibility requirement is intended to minimize or mitigate the damage to the other vehicle in the event of crash.

The above problems and other problems are addressed by this disclosure as summarized below.

SUMMARY

According to one aspect of this disclosure, a front end structure is provided for a vehicle to enhance vehicle compatibility performance. The front end structure includes a front fascia and a bumper disposed behind the front fascia. A crush can is attached between the bumper and a frame member. A shield is attached to the bumper that extends above the bumper and below the bumper to spread deformation of a deformable barrier caused by the crush cans to areas above and below the bumper in response to an impact with the deformable barrier. The shield mitigates deep deformations by dispersing the concentrated loading around the bumper beam and crush cans.

According to other aspects of this disclosure, the shield may include a plurality of vertically extending ribs that extend above and below the bumper. The ribs may be spaced apart by planar sections that extend in a vertical plane parallel to a front surface of the bumper. The ribs may be contiguous with the planar sections at top and bottom distal edges of the shield and extend in a rearward direction as they approach the bumper. Alternatively, the ribs may be planar ribs offset in a longitudinal direction relative to the planar sections.

The shield may also include a transversely extending central section that is mechanically attached to the bumper.

The shield may extend above the bumper to a hood support frame and may extend below the bumper to a sub-frame that supports an engine of the vehicle. The shield may also extend from a grille opening of the vehicle to a lateral end of the bumper beam.

The front end structure may further comprise a front fascia and a foam layer that is in contact with a rear surface of the front fascia with the shield being attached as a backing to the foam layer.

According to another aspect of this disclosure, a front fascia assembly is provided for a vehicle to enhance vehicle compatibility performance. The front fascia assembly includes a front fascia panel, a foam energy absorbing layer and a shield attached to a back surface of the foam layer. The foam polymeric layer is applied to a rear surface of the front fascia panel. The shield is attached to a back surface of the foam layer and is adapted to be attached to a bumper beam of the vehicle.

According to other aspects of this disclosure as it relates to a front fascia assembly, a clip may be assembled to the shield that connects the front fascia assembly to the bumper of the vehicle. Alternatively or in addition, a plurality of fasteners may be utilized to attach the shield to the bumper beam.

The foam polymeric layer of the front fascia assembly may be foamed polyurethane. The front fascia panel may be an injection molded thermoplastic part.

The shield of the front fascia assembly may be a relatively rigid polymer sheet that extends above the bumper beam to a hood support frame and extends below the bumper beam to a sub-frame that supports an engine of the vehicle. Alternatively, the shield may be made of aluminum or steel.

The shield enhances the MPDB/bumper interaction zone at the top and bottom of the bumper beam. The crush can/bumper beam area is enlarged to provide more even contact with the barrier. The shield also provides additional support to the front fascia to further smooth the contact area.

The above aspects of this disclosure and other aspects will be described below with reference to the attached drawings.

BRIEF DESCRIPTION OF THE DRAWINGS

FIG. 5 is a rear elevation view of the frontal shield in isolation that potentially is applicable to both of the embodiments of FIGS. 3 and 4.

FIG. 6 is a top plan view taken along the line 6-6 in FIG. 4.

FIG. 7 is a diagrammatic vertical cross-section view of an alternative frontal shield, fascia panel, polymeric foam filler, bumper and crash cans.

FIG. 8 is a chart showing the results of a 2020 Euro NCAP simulated test of a vehicle having a front end structure that does not include the impact spreading frontal shield in terms of homogeneity of the deformation of the movable barrier.

FIG. 9 is a chart showing the results of a 2020 Euro NCAP simulated test of a vehicle having a frontal shield in terms of homogeneity of the deformation of the movable barrier.

DETAILED DESCRIPTION

The illustrated embodiments are disclosed with reference to the drawings. However, it is to be understood that the disclosed embodiments are intended to be merely examples that may be embodied in various and alternative forms. Elements of the different embodiments may be combined to provide additional examples. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
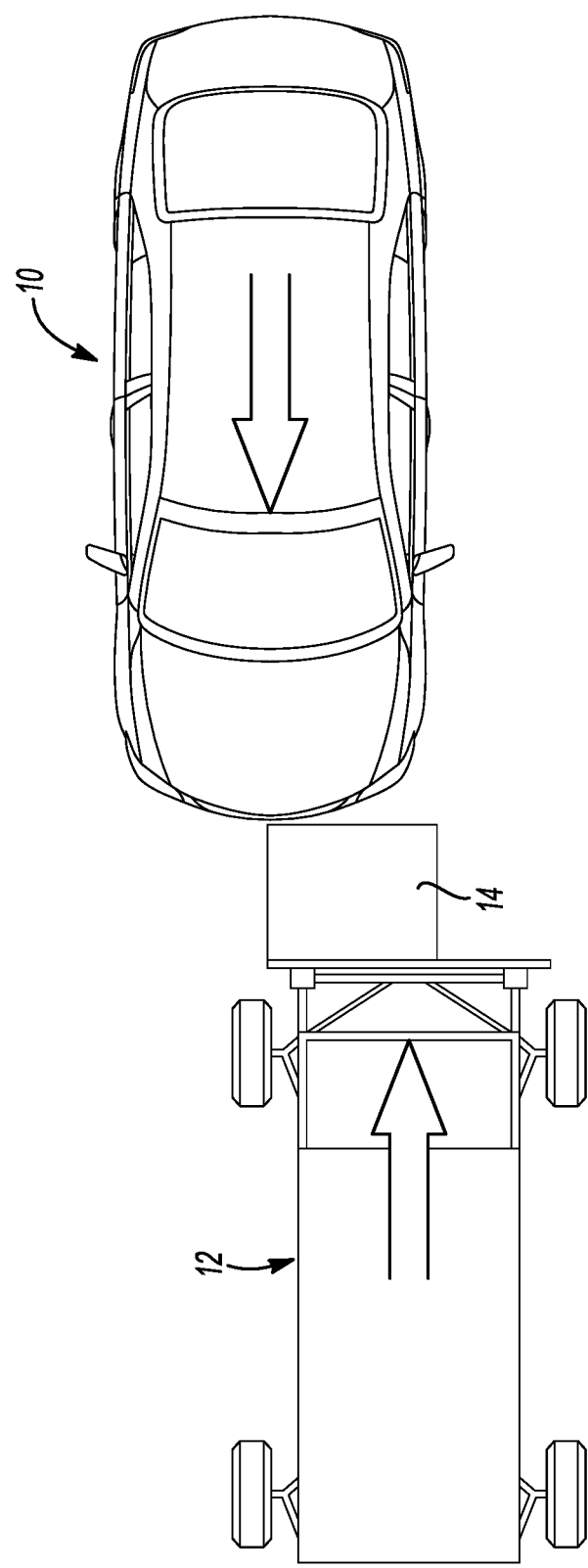
FIG. 1 is a diagrammatic top plan view of a vehicle and a movable deformable barrier just prior to an impact in a 2020 Euro NCAP Mobile Progressive Deformable Barrier Front Offset Impact Test.

Referring to FIG. 1, a vehicle 10 is shown with a Moveable Progressive Deformable Barrier (MPDB) trolley 12 just prior to a collision in a 2020 Euro NCAP Test. The MPDB trolley 12 supports and maneuvers a deformable barrier 14 comprising a cube-shaped assembly of hexagonal crush tubes 16.

Figure 2:
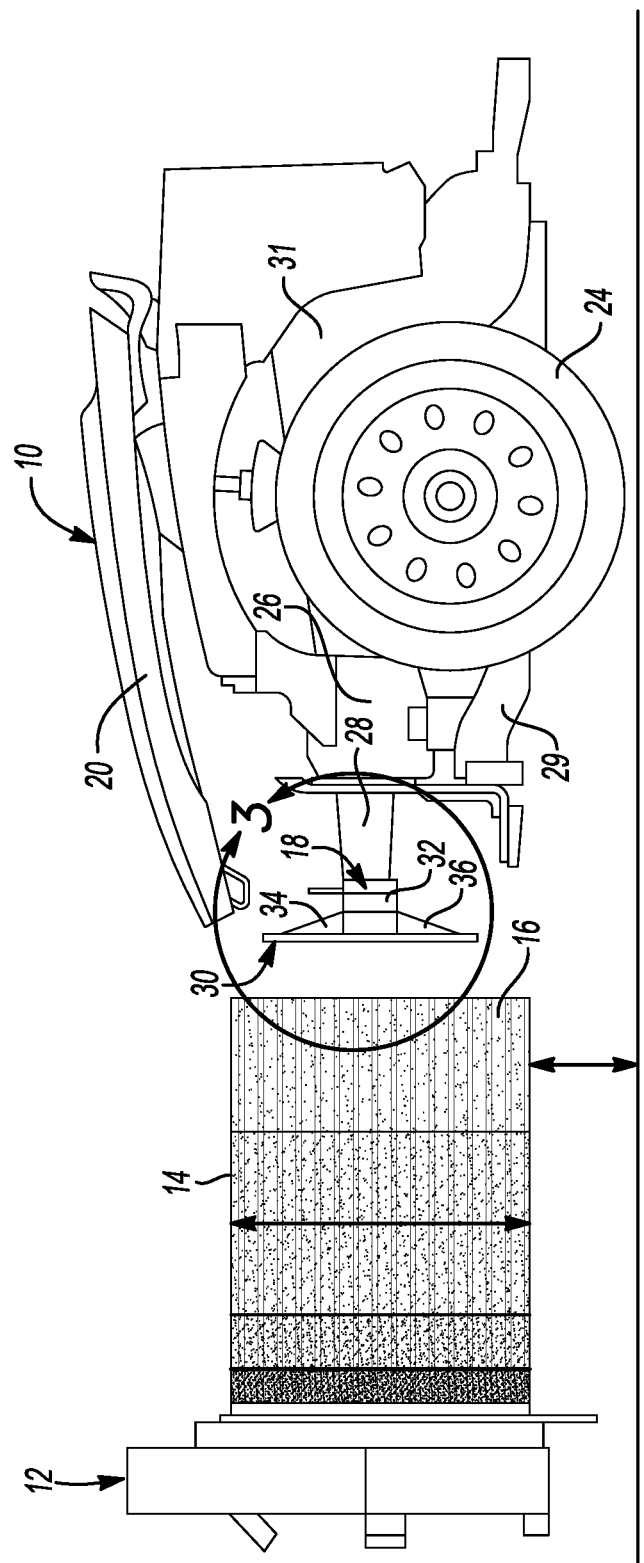
FIG. 2 is a diagrammatic side elevation view of a vehicle equipped with a frontal shield made according to one aspect of this disclosure and the movable deformable barrier shown in FIG. 1 in the 2020 Euro NCAP Mobile Progressive Deformable Barrier Front Offset Impact Test.

Referring to FIG. 2, the vehicle 10 is shown with the MPDB trolley 12 and the deformable barrier 14 disposed just in front of a bumper assembly 18 of the vehicle 10. The bumper assembly 18 is shown below the hood 20 of the vehicle 10 and in front of the front wheel 24 of the vehicle 10. In the test, the vehicle 10 having a mass of 1800 Kg is moved at 50 Km/hr toward the barrier vehicle 12 while the MPDB trolley 12 having a mass of 1400 Kg is moved at 50 Km/hr in an offset head-on collision. Following the collision, the deformable barrier 14 is scanned with a 3-D scanner that is used to measure the deformation of the deformable carrier 14 as a result of the off-set head-on collision. Consistent deformation across the face of the deformable barrier 14 is considered to be homogenous while a non-uniform deformation of the deformable barrier 14 is considered to be non-homogenous. Based upon the 3-D scanning data, the value for homogeneity/geometry is assigned as the test result.

The vehicle 10 may be built on a frame 26 that may be a conventional frame including frame rails or may be a uni-body frame formed by the assembly of parts including portions of the frame 26. A subframe 29 is provided to support an engine 31 of the vehicle 10. Crush cans 28 are assembled to the front of the frame 26 to absorb the force of an impact in a collision. Other types of collision impact absorbing structures may be used instead of the crush cans 28. In the 2020 Euro NCAP test of vehicles without a frontal shield 30, deep penetration of the deformable barrier 14 (shown in FIGS. 1 and 2) tends to occur where the crush cans 28 are secured to a bumper beam 32. The deformable barrier 14 also tends to be substantially deformed above and below the bumper beam 32.

The frontal shield 30 made according to one embodiment of this disclosure is shown attached to the bumper beam 32. The frontal shield 30 includes upper reinforcing ribs 34 and lower reinforcing ribs 36. The structure of the upper and lower reinforcing ribs 34, 36 are described in greater detail below with reference to FIG. 3.

Figure 3:
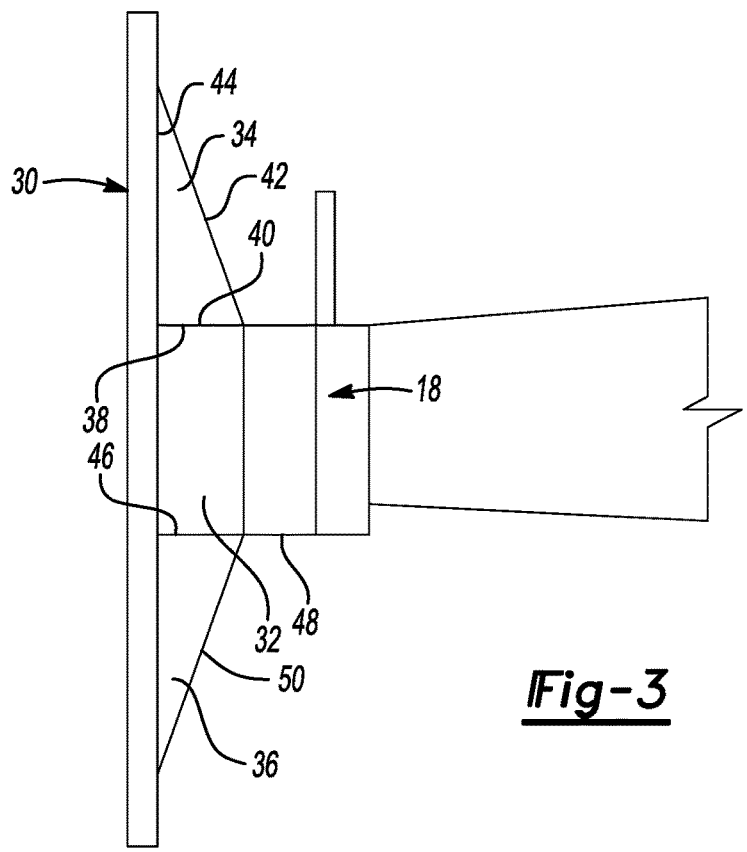
FIG. 3 is a fragmentary side elevation view taken within the circle 3 in FIG. 2 of a bumper, crush can, frame and sub-frame with a frontal shield made according to one aspect of this disclosure.

Referring to FIG. 3, the upper reinforcing ribs 34 are wedge-shaped with a lower end 38 overlying an upper surface 40 of the bumper beam 32 and a rear wall 42 extending from the upper surface 40 to a rear surface 44 of the frontal shield 30. The lower reinforcing ribs 36 are wedge-shaped with an upper end 46 overlying a lower surface 48 of the bumper beam 32 and a rear wall 50 extending from the lower surface 48 to the rear surface 44 of the frontal shield 30. A plurality of upper and lower reinforcing ribs 34, 36 are provided across the width of the rear surface 44 of the frontal shield 30.

Figure 4:
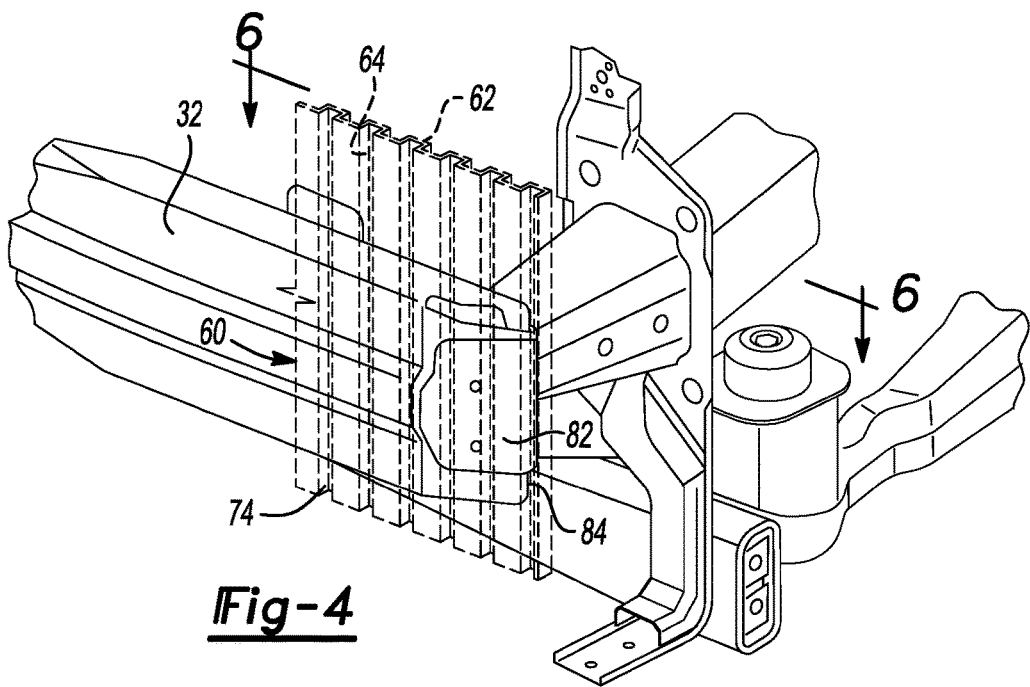
FIG. 4 is a fragmentary perspective view of a vehicle front end frontal shield with the bumper, crush can, frame and sub-frame showing an alternative frontal shield in phantom lines made according to one aspect of this disclosure.

Referring to FIGS. 4-6, an alternative embodiment of a frontal shield 60 is illustrated that includes a plurality of upper rectangular reinforcing ribs 62. The ribs 62 each define a rectangular recess 64 within a rear wall 66, a right side wall 68 and a left side wall 70. A plurality of lower rectangular reinforcing ribs 72 each define a rectangular recess 74 within a rear wall 76, a right side wall 78 and a left side wall 80.

Referring to FIG. 4, the frontal shield 60 may be attached to the bumper beam 32 with a clip 82 secured to an outer end 84 of the bumper beam. While not specifically shown, the frontal shield 30 depicted in FIGS. 2 and 3 could be attached in a similar way to the bumper beam 32.

Referring to FIG. 5, the rear elevation view of the shield shown in FIGS. 3 and 4 are similar in that the rear view of the spaced wedge-shaped ribs 34, 36 and the rectangular ribs 62, 72 may be the same.

Referring to FIG. 6, the frontal shield 60 may be attached to the bumper beam 32 with a plurality of fasteners 86 such as a bolt, rivet, flow drill screw, or the like. The frontal shield 60 may also be attached to the bumper beam 32 with an adhesive. The frontal shield 30 illustrated in FIGS. 2 and 3 could be similarly attached to the bumper beam 32.

Referring to FIG. 7, another alternative embodiment of a frontal shield 90 is illustrated that is provided as part of an assembly including a fascia panel 92 that is backed by a polymeric foam filler 94. The frontal shield 90 is a planar panel that does not include any reinforcing ribs as illustrated. It should be understood that the frontal shield 30 including wedge shaped ribs 34, 36 (shown in FIGS. 2 and 3) or the frontal shield 60 including rectangular reinforcing ribs 62, 72 (shown in FIGS. 4-6) could be substituted for the planar frontal shield 90 in an assembly with the fascia panel 92 and foam filler 94. The fascia panel 92 forms the Class A surface at the front of the vehicle. The frontal shield 90 may be included as a part-in-assembly with the fascia panel 92 and polymeric foam filler 94 forming as a backing for the foam filler 94. With this approach, the frontal shield 90 may be assembled to the vehicle as part of the conventional fascia panel 92 assembly process.

The fascia panel 92 and foam filler 94 initially absorb the force of an impact. If the impact is relatively minor, the foam may fully absorb the impact. But in a substantial impact, the force of the impact is transferred through the foam to the frontal shield 90, the bumper beam 32, the crush cans 28 and the frame 26. The frontal shield 90 functions to increase the homogeneity of the deformation of the deformable barrier and improve vehicle compatibility performance in the 2020 Euro NCAP test.

Referring to FIG. 8, a chart rating the homogeneity/geometry of the barrier (standard deviation of the intrusion in the measured area) after a 2020 Euro NCAP simulated test collision is presented that reflects that the front end structure without an impact spreading rail was rated at 103. The homogeneity/geometry rating is weighted at 75% and was determined to be "Bare Minimum." In the simulated test, a value is also assigned for the energy input to the movable barrier was rated at 2.2 (energy absorption of the MPDB within the rating area by estimated stiffness and deformed volume) and was given a 25% weight. The energy input is a product of the barrier energy rating of 79% and the delta velocity of the barrier of 56.2 Km/hr (the difference of the initial velocity and minimum velocity). The barrier energy value and delta velocity values were each weighted 50% and resulted in a "Very Good" rating for the barrier energy and an "Average" acceptability rating for the delta velocity barrier value. The overall rating for the simulated bumper beam was 3.3 and evaluated as being "Average."

Referring to FIG. 9, a chart rating the homogeneity/geometry simulated test for a front end underbody structure including a frontal shield resulted in a homogeneity/geometry result of 81. The barrier energy was 55% and delta velocity barrier value was 57.1 km/h. The homogeneity/geometry result of 95 in the test of FIG. 8 improved to 81 and was rated as an "Average" acceptability rating. When the homogeneity/geometry rating of 2.8 was combined with the energy input value of 2.7 and weighted as described above, the overall rating of the vehicle with the frontal shield was rated "Average." The Barrier Energy rating of 55% was rated as "Good" and represents a 16% improvement in homogeneity over the test result reported in FIG. 8.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A front end structure for a vehicle comprising:
    a front fascia;
    a bumper disposed behind the front fascia;
    a crush can attached between the bumper and a frame member; and
    a shield attached to the bumper that extends above the bumper and below the bumper to spread deformation of a deformable barrier caused by the crush can above and below the bumper in response to an impact with the deformable barrier, wherein the shield includes a plurality of vertically extending ribs that extend above and below the bumper, wherein the ribs are spaced apart by planar sections that extend in a vertical plane parallel to a front surface of the bumper, wherein the ribs are contiguous with the planar sections at top and bottom distal edges of the shield and extend in a rearward direction as they approach the bumper.

2. A front end structure for a vehicle comprising:
    a front fascia;
    a bumper disposed behind the front fascia;
    a crush can attached between the bumper and a frame member; and
    a shield attached to the bumper that extends above the bumper and below the bumper to spread deformation of a deformable barrier caused by the crush can above and below the bumper in response to an impact with the deformable barrier, wherein the shield includes a plurality of vertically extending ribs that extend above and below the bumper, wherein the ribs are spaced apart by planar sections that extend in a vertical plane parallel to a front surface of the bumper, wherein the ribs are planar ribs offset in a longitudinal direction relative to the planar sections.

3. The front end structure of claim 1 wherein the shield has a central transversely extending central section is mechanically attached to the bumper.

4. The front end structure of claim 1 wherein the shield extends above the bumper to a hood support frame.

5. The front end structure of claim 4 wherein the shield extends below the bumper to a sub-frame that supports an engine of the vehicle.

6. The front end structure of claim 1 wherein the shield extends below the bumper to a sub-frame that supports an engine of the vehicle.

7. The front end structure of claim 1 further comprising:
    a foam layer in contact with a rear surface of the front fascia, wherein the shield is attached as a backing to the foam layer.

8. A front fascia assembly for a vehicle comprising:
    a front fascia panel;
    a polymeric foam layer applied to a rear surface of the front fascia panel; and
    a shield attached to a back surface of the foam layer, wherein the shield is adapted to be attached to a bumper beam of the vehicle, wherein the shield is a relatively rigid polymer sheet that extends above the bumper beam to a hood support frame and extends below the bumper beam to a sub-frame that supports an engine of the vehicle.

9. The front fascia assembly of claim 8 further comprising:
    a clip assembled to the shield that connects the front fascia assembly to the bumper beam of the vehicle.

10. The front fascia assembly of claim 8 further comprising:
    a plurality of fasteners that are utilized to attach the shield to the bumper beam.

11. The front fascia assembly of claim 8 wherein the foam polymeric layer is foamed polyurethane.

12. The front fascia assembly of claim 8 wherein the front fascia panel is an injection molded thermoplastic.

13. The front fascia assembly of claim 8 wherein the shield extends from a grille opening of the vehicle to a lateral end of the bumper beam.

14. The front fascia assembly of claim 8 wherein the shield includes a plurality of vertically extending ribs.

15. The front fascia assembly of claim 14 wherein the ribs are spaced apart by planar sections that extend in a vertical plane parallel to a front surface of the bumper beam.

16. The front fascia assembly of claim 14 wherein the ribs are contiguous with a plurality of planar sections at top and bottom distal edges of the shield and extend in a rearward direction as they approach the bumper beam.

17. A fascia assembly for a vehicle comprising:
    a fascia panel;
    a polymeric foam layer applied to a rear surface of the fascia panel; and
    a shield attached to a back surface of the foam layer and a bumper beam of the vehicle, wherein the shield is a polymer sheet that extends above the bumper beam to a hood support frame and extends below the bumper beam to a sub-frame supporting an engine of the vehicle.

* * * * *